US012038835B2

(12) United States Patent
Tal et al.

(10) Patent No.: US 12,038,835 B2
(45) Date of Patent: Jul. 16, 2024

(54) GARBAGE COLLECTION PROCESSING IN STORAGE SYSTEMS

(71) Applicant: Dell Products L.P., Round Rock, TX (US)

(72) Inventors: Doron Tal, Geva Carmel (IL); Amitai Alkalay, Kadima (IL)

(73) Assignee: Dell Products L.P., Round Rock, TX (US)

( * ) Notice: Subject to any disclaimer, the term of this patent is extended or adjusted under 35 U.S.C. 154(b) by 65 days.

(21) Appl. No.: 17/964,136

(22) Filed: Oct. 12, 2022

(65) Prior Publication Data

US 2024/0126687 A1 Apr. 18, 2024

(51) Int. Cl.
*G06F 12/02* (2006.01)
*G06F 3/06* (2006.01)

(52) U.S. Cl.
CPC ........ *G06F 12/0253* (2013.01); *G06F 3/0608* (2013.01); *G06F 3/0667* (2013.01); *G06F 3/067* (2013.01)

(58) Field of Classification Search
CPC .... G06F 12/0253; G06F 3/0608; G06F 3/067; G06F 3/0667
See application file for complete search history.

(56) References Cited

U.S. PATENT DOCUMENTS

| 7,509,468 | B1* | 3/2009 | Dalal | G06F 21/562 |
| | | | | 711/163 |
| 8,260,750 | B1* | 9/2012 | Gugick | G06F 11/1461 |
| | | | | 707/645 |
| 9,760,445 | B1* | 9/2017 | Chopra | G06F 3/0683 |
| 10,157,107 | B2* | 12/2018 | Lad | G06F 11/1469 |
| 11,099,946 | B1* | 8/2021 | Chopra | G06F 11/1451 |
| 2008/0059732 | A1* | 3/2008 | Okada | G06F 11/1471 |
| | | | | 711/165 |
| 2023/0195578 | A1* | 6/2023 | Lee | G06F 11/1451 |
| | | | | 707/645 |
| 2023/0259311 | A1* | 8/2023 | Bhattacharjee | G06F 3/0613 |
| | | | | 711/154 |

OTHER PUBLICATIONS

Amazon Web Services, "Cloud Object Storage—Amazon S3," https://aws.amazon.com/s3/, Accessed Sep. 28, 2022, 6 pages.

(Continued)

*Primary Examiner* — Mark A Giardino, Jr.
(74) *Attorney, Agent, or Firm* — Ryan, Mason & Lewis, LLP

(57) ABSTRACT

An apparatus comprises a processing device configured to initiate garbage collection for data pages stored in local storage of a storage node of a storage system. The processing device is also configured to determine, for a given data page stored in the local storage of the storage node, a validity score characterizing a size of changed data in the given data page, and to compare the validity score for the given data page to at least one designated threshold. The processing device is further configured to update a given page object for the given data page in an object store of persistent storage responsive to a first comparison result, and to generate, in the object store of the persistent storage, a page delta object for the given data page responsive to a second comparison result, the page delta object comprising the changed data in the given data page.

20 Claims, 8 Drawing Sheets

(56) References Cited

OTHER PUBLICATIONS

Amazon Web Services, "EC2," https://aws.amazon.com/pm/ec2/, Accessed Sep. 28, 2022, 5 pages.
Amazon Web Services, "High-Performance Block Storage—Amazon EBS," https://aws.amazon.com/ebs/, Accessed Sep. 28, 2022, 6 pages.
Dell Technologies, "Dell PowerFlex," Specification Sheet, Aug. 2022, 7 pages.
Dell Technologies, "Dell EMC PowerFlex Software-Defined Storage for Modern Datacenters," Solution Brief, Jun. 2020, 3 pages.
Dell Technologies, "Dell PowerFlex Unbounded Software-defined Infrastructure for the Modern Enterprise," Solution Brief, Aug. 2022, 2 pages.
J. Powell et al., "Data Reduction Demystified," Dell Technologies Knowledge Sharing Article, Aug. 2022, 24 pages.
R. Bruno et al., "A Study on Garbage Collection Algorithms for Big Data Environments," ACM Computing Surveys, Jan. 2016, 35 pages.

* cited by examiner

GARBAGE COLLECTION PROCESSING IN STORAGE SYSTEMS

FIELD

The field relates generally to information processing, and more particularly to storage in information processing systems.

BACKGROUND

Various types of storage systems, including storage systems implementing software-defined storage (SDS) solutions, may be configured to run workloads from multiple different end-users or applications. Different end-users or applications may have different performance and feature requirements for their associated workloads. In some workloads, performance may be most important. In other workloads, capacity utilization or other feature requirements may be most important. There is thus a need for techniques which enable a storage system to offer flexibility in storage offerings for workloads with different performance and feature requirements.

SUMMARY

Illustrative embodiments of the present disclosure provide techniques for performing garbage collection in storage systems that utilize an object store in persistent storage.

In one embodiment, an apparatus comprises at least one processing device comprising a processor coupled to a memory. The at least one processing device is configured to perform the step of initiating, for a storage system comprising two or more storage nodes, garbage collection for data pages stored in local storage of at least one of the two or more storage nodes, the storage system further comprising persistent storage implementing an object store. The at least one processing device is also configured to perform the steps of determining, for a given one of the data pages stored in the local storage of said at least one of the two or more storage nodes, a validity score characterizing a size of changed data in the given data page, and comparing the validity score for the given data page to at least one designated threshold. The at least one processing device is further configured to perform the steps of updating a given page object for the given data page in the object store of the persistent storage responsive to a first comparison result, and generating, in the object store of the persistent storage, a page delta object for the given data page responsive to a second comparison result different than the first comparison result, the page delta object comprising the changed data in the given data page.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1A:
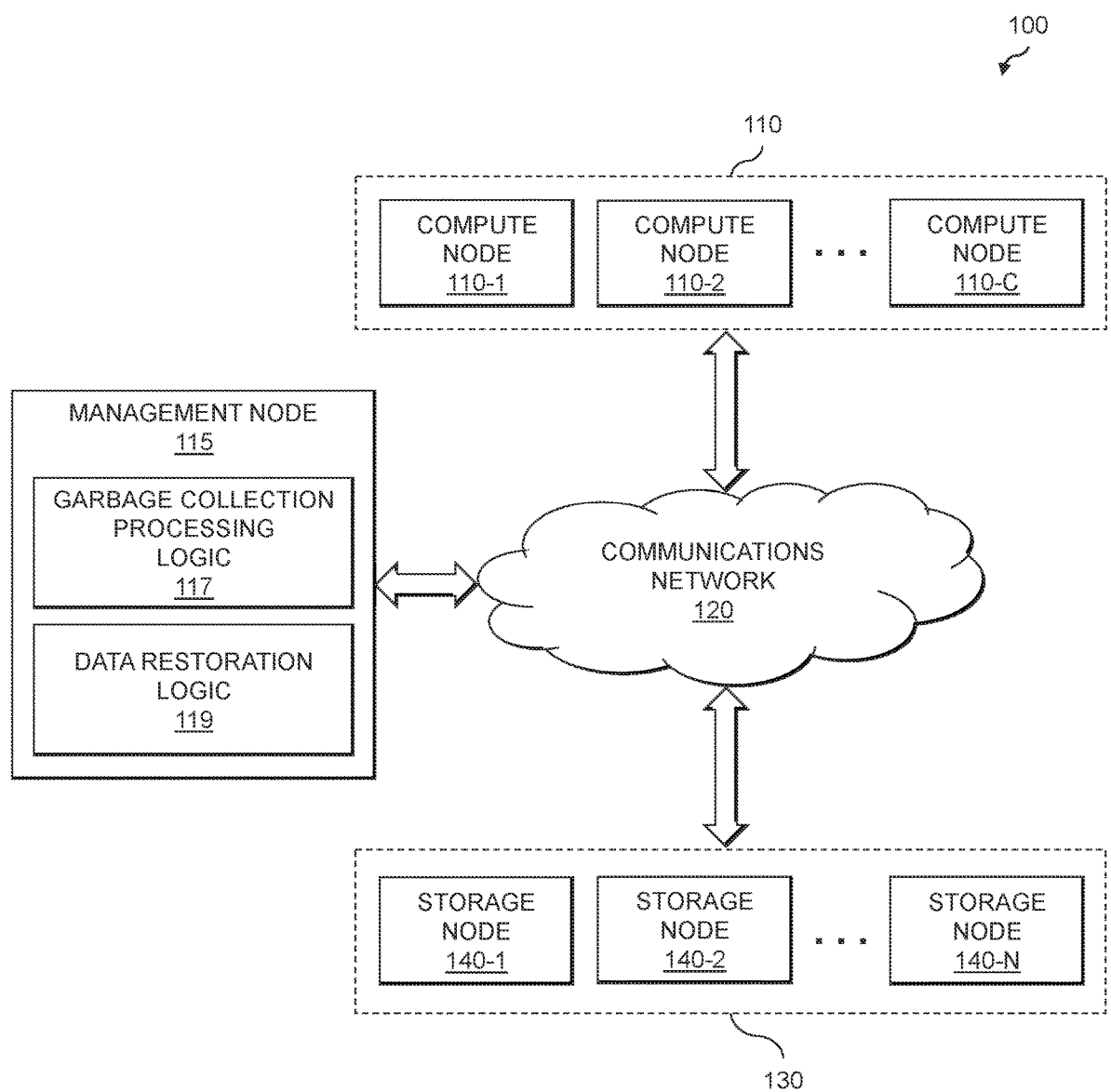
FIGS. 1A and 1B schematically illustrate an information processing system comprising a storage system configured for efficient garbage collection processing in an illustrative embodiment.
Figure 1B:
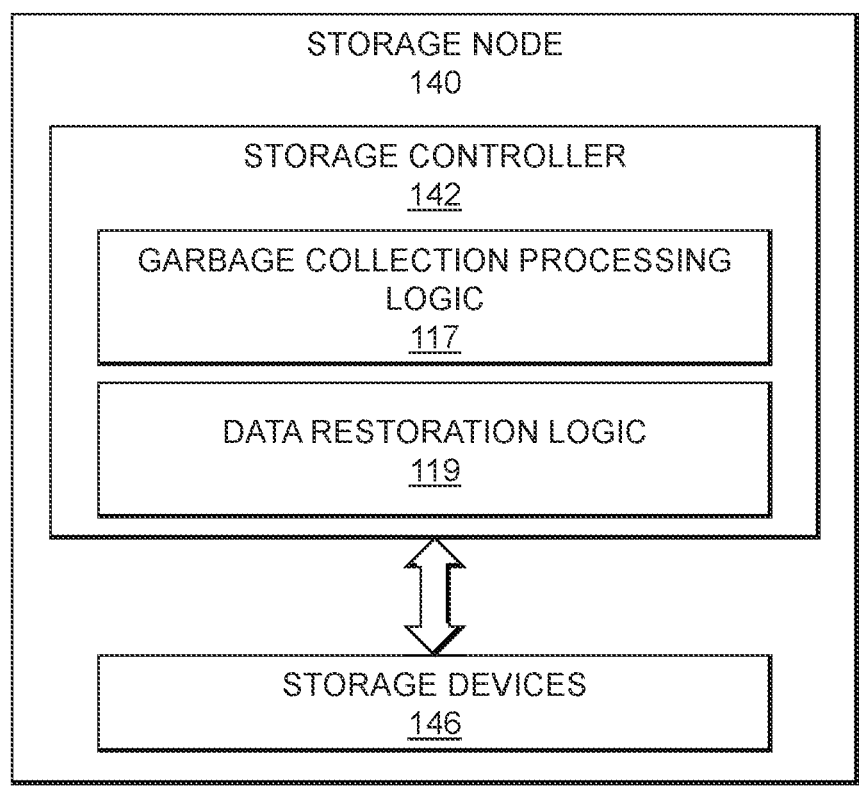

FIGS. 1A and 1B schematically illustrate an information processing system which is configured for efficient garbage collection processing for object store-based persistent storage according to an exemplary embodiment of the disclosure. More specifically, FIG. 1A schematically illustrates an information processing system 100 which comprises a plurality of compute nodes 110-1, 110-2, . . . , 110-C (collectively referred to as compute nodes 110, or each singularly referred to as a compute node 110), one or more management nodes 115 (which support a management layer of the system 100), a communications network 120, and a data storage system 130 (which supports a data storage layer of the system 100). The data storage system 130 comprises a plurality of storage nodes 140-1, 140-2, . . . , 140-N (collectively referred to as storage nodes 140, or each singularly referred to as a storage node 140). In the context of the exemplary embodiments described herein, the management nodes 115 and the data storage system 130 implement garbage collection (GC) processing logic 117 and data restoration logic 119 supporting optimization or improvement of IO processing in the data storage system 130 utilizing SDS resources. FIG. 1B schematically illustrates an exemplary framework of at least one or more of the storage nodes 140.

In particular, as shown in FIG. 1B, the storage node 140 comprises a storage controller 142 and a plurality of storage devices 146. In general, the storage controller 142 implements data storage and management methods that are configured to divide the storage capacity of the storage devices 146 into storage pools and logical volumes. Storage controller 142 is further configured to implement GC processing logic 117 and data restoration logic 119 in accordance with the disclosed embodiments, as will be described in further detail below. Various other examples are possible. It is to be noted that the storage controller 142 may include additional modules and other components typically found in conventional implementations of storage controllers and storage systems, although such additional modules and other components are omitted for clarity and simplicity of illustration.

In the embodiment of FIGS. 1A and 1B, the GC processing logic 117 and the data restoration logic 119 may be implemented at least in part within the one or more management nodes 115 as well as in one or more of the storage nodes 140 of the data storage system 130. This may include implementing different portions of the GC processing logic 117 and the data restoration logic 119 functionality described herein being implemented within the management nodes 115 and the storage nodes 140. In other embodiments, however, the GC processing logic 117 and the data restoration logic 119 may be implemented entirely within the management nodes 115 or entirely within the storage nodes 140. In still other embodiments, at least a portion of the functionality of the GC processing logic 117 and the data restoration logic 119 is implemented in one or more of the compute nodes 110.

The compute nodes 110 illustratively comprise physical compute nodes and/or virtual compute nodes which process data and execute workloads. For example, the compute nodes 110 can include one or more server nodes (e.g., bare metal server nodes) and/or one or more virtual machines. In some embodiments, the compute nodes 110 comprise a cluster of physical server nodes or other types of computers of an enterprise computer system, cloud-based computing system or other arrangement of multiple compute nodes associated with respective users. In some embodiments, the compute nodes 110 include a cluster of virtual machines that execute on one or more physical server nodes.

The compute nodes 110 are configured to process data and execute tasks/workloads and perform computational work, either individually, or in a distributed manner, to thereby provide compute services such as execution of one or more applications on behalf of each of one or more users associated with respective ones of the compute nodes. Such applications illustratively issue IO requests that are processed by a corresponding one of the storage nodes 140. The term "input-output" as used herein refers to at least one of input and output. For example, IO requests may comprise write requests and/or read requests directed to stored data of a given one of the storage nodes 140 of the data storage system 130.

The compute nodes 110 are configured to write data to and read data from the storage nodes 140 in accordance with applications executing on those compute nodes for system users. The compute nodes 110 communicate with the storage nodes 140 over the communications network 120. While the communications network 120 is generically depicted in FIG. 1A, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks.

In this regard, the term "network" as used herein is therefore intended to be broadly construed so as to encompass a wide variety of different network arrangements, including combinations of multiple networks possibly of different types, which enable communication using, e.g., Transfer Control/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement IO channels and support storage network connectivity. Numerous alternative networking arrangements are possible in a given embodiment, as will be appreciated by those skilled in the art.

The data storage system 130 may comprise any type of data storage system, or a combination of data storage systems, including, but not limited to, a storage area network (SAN) system, a network attached storage (NAS) system, a direct-attached storage (DAS) system, etc., as well as other types of data storage systems comprising software-defined storage, clustered or distributed virtual and/or physical infrastructure. The term "data storage system" as used herein should be broadly construed and not viewed as being limited to storage systems of any particular type or types. In some embodiments, the storage nodes 140 comprise storage server nodes having one or more processing devices each having a processor and a memory, possibly implementing virtual machines and/or containers, although numerous other configurations are possible. In some embodiments, one or more of the storage nodes 140 can additionally implement functionality of a compute node, and vice-versa. The term "storage node" as used herein is therefore intended to be broadly construed, and a storage system in some embodiments can be implemented using a combination of storage nodes and compute nodes.

In some embodiments, as schematically illustrated in FIG. 1B, the storage node 140 is a physical server node or storage appliance, wherein the storage devices 146 comprise DAS resources (internal and/or external storage resources) such as hard-disk drives (HDDs), solid-state drives (SSDs), Flash memory cards, or other types of non-volatile memory (NVM) devices such non-volatile random access memory (NVRAM), phase-change RAM (PC-RAM) and magnetic RAM (MRAM). These and various combinations of multiple different types of storage devices 146 may be implemented in the storage node 140. In this regard, the term "storage device" as used herein is intended to be broadly construed, so as to encompass, for example, SSDs, HDDs, flash drives, hybrid drives or other types of storage media. The storage devices 146 are connected to the storage node 140 through any suitable host interface, e.g., a host bus adapter, using suitable protocols such as ATA, SATA, eSATA, NVMe, NVMeOF, SCSI, SAS, etc. In other embodiments, the storage node 140 can be network connected to one or more NAS nodes over a local area network.

The storage controller 142 is configured to manage the storage devices 146 and control 10 access to the storage devices 146 and/or other storage resources (e.g., DAS or NAS resources) that are directly attached or network-connected to the storage node 140. In some embodiments, the storage controller 142 is a component (e.g., storage data server) of a software-defined storage (SDS) system which supports the virtualization of the storage devices 146 by separating the control and management software from the hardware architecture. More specifically, in a software-defined storage environment, the storage controller 142 comprises an SDS storage data server that is configured to abstract storage access services from the underlying storage hardware to thereby control and manage 10 requests issued by the compute nodes 110, as well as to support networking and connectivity. In this instance, the storage controller 142 comprises a software layer that is hosted by the storage node 140 and deployed in the data path between the compute nodes 110 and the storage devices 146 of the storage node 140, and is configured to respond to data 10 requests from the compute nodes 110 by accessing the storage devices 146 to store/retrieve data to/from the storage devices 146 based on the 10 requests.

In a software-defined storage environment, the storage controller 142 is configured to provision, orchestrate and manage the local storage resources (e.g., the storage devices 146) of the storage node 140. For example, the storage controller 142 implements methods that are configured to create and manage storage pools (e.g., virtual pools of block storage) by aggregating capacity from the storage devices 146. The storage controller 142 can divide a storage pool into one or more volumes and expose the volumes to the compute nodes 110 as virtual block devices. For example, a virtual block device can correspond to a volume of a storage pool. Each virtual block device comprises any number of actual physical storage devices, wherein each block device is preferably homogenous in terms of the type of storage devices that make up the block device (e.g., a block device only includes either HDD devices or SSD devices, etc.).

In the software-defined storage environment, each of the storage nodes 140 in FIG. 1A can run an instance of the storage controller 142 to convert the respective local storage resources (e.g., DAS storage devices and/or NAS storage devices) of the storage nodes 140 into local block storage. Each instance of the storage controller 142 contributes some or all of its local block storage (HDDs, SSDs, PCIe, NVMe and flash cards) to an aggregated pool of storage of a storage server node cluster (e.g., cluster of storage nodes 140) to implement a server-based storage area network (SAN) (e.g., virtual SAN). In this configuration, each storage node 140 is part of a loosely coupled server cluster which enables "scale-out" of the software-defined storage environment, wherein each instance of the storage controller 142 that runs on a respective one of the storage nodes 140 contributes its local storage space to an aggregated virtual pool of block storage with varying performance tiers (e.g., HDD, SSD, etc.) within a virtual SAN.

In some embodiments, in addition to the storage controllers 142 operating as SDS storage data servers to create and expose volumes of a storage layer, the software-defined storage environment comprises other components such as (i) SDS data clients that consume the storage layer and (ii) SDS metadata managers that coordinate the storage layer, which are not specifically shown in FIG. 1A. More specifically, on the client-side (e.g., compute nodes 110), an SDS data client (SDC) is a lightweight block device driver that is deployed on each server node that consumes the shared block storage volumes exposed by the storage controllers 142. In particular, the SDCs run on the same servers as the compute nodes 110 which require access to the block devices that are exposed and managed by the storage controllers 142 of the storage nodes 140. The SDC exposes block devices representing the virtual storage volumes that are currently mapped to that host. In particular, the SDC serves as a block driver for a client (server), wherein the SDC intercepts IO requests, and utilizes the intercepted IO request to access the block storage that is managed by the storage controllers 142. The SDC provides the operating system or hypervisor (which runs the SDC) access to the logical block devices (e.g., volumes).

The SDCs have knowledge of which SDS control systems (e.g., storage controller 142) hold its block data, so multipathing can be accomplished natively through the SDCs. In particular, each SDC knows how to direct an IO request to the relevant destination SDS storage data server (e.g., storage controller 142). In this regard, there is no central point of routing, and each SDC performs its own routing independent from any other SDC. This implementation prevents unnecessary network traffic and redundant SDS resource usage. Each SDC maintains peer-to-peer connections to every storage controller 142 that manages the storage pool. A given SDC can communicate over multiple pathways to all of the storage nodes 140 which store data that is associated with a given IO request. This multi-point peer-to-peer fashion allows the SDS to read and write data to and from all points simultaneously, eliminating bottlenecks and quickly routing around failed paths.

The management nodes 115 in FIG. 1A implement a management layer that is configured to manage and configure the storage environment of the system 100. In some embodiments, the management nodes 115 comprise the SDS metadata manager components, wherein the management nodes 115 comprise a tightly-coupled cluster of nodes that are configured to supervise the operations of the storage cluster and manage storage cluster configurations. The SDS metadata managers operate outside of the data path and provide the relevant information to the SDS clients and storage servers to allow such components to control data path operations. The SDS metadata managers are configured to manage the mapping of SDC data clients to the SDS data storage servers. The SDS metadata managers manage various types of metadata that are required for system operation of the SDS environment such as configuration changes, managing the SDS data clients and data servers, device mapping, values, snapshots, system capacity including device allocations and/or release of capacity, RAID protection, recovery from errors and failures, and system rebuild tasks including rebalancing.

While FIG. 1A shows an exemplary embodiment of a two-layer deployment in which the compute nodes 110 are separate from the storage nodes 140 and connected by the communications network 120, in other embodiments, a converged infrastructure (e.g., hyperconverged infrastructure) can be implemented to consolidate the compute nodes 110, storage nodes 140, and communications network 120 together in an engineered system. For example, in a hyperconverged deployment, a single-layer deployment is implemented in which the storage data clients and storage data servers run on the same nodes (e.g., each node deploys a storage data client and storage data servers) such that each node is a data storage consumer and a data storage supplier. In other embodiments, the system of FIG. 1A can be implemented with a combination of a single-layer and two-layer deployment.

Regardless of the specific implementation of the storage environment, as noted above, various modules of the storage controller 142 of FIG. 1B collectively provide data storage and management methods that are configured to perform various functions as follows. In particular, a storage virtualization and management services module may implement any suitable logical volume management (LVM) system which is configured to create and manage local storage volumes by aggregating the local storage devices 146 into one or more virtual storage pools that are thin-provisioned for maximum capacity, and logically dividing each storage pool into one or more storage volumes that are exposed as block devices (e.g., raw logical unit numbers (LUNs)) to the compute nodes 110 to store data. In some embodiments, the storage devices 146 are configured as block storage devices where raw volumes of storage are created and each block can be controlled as, e.g., an individual disk drive by the storage controller 142. Each block can be individually formatted with a same or different file system as required for the given data storage system application.

In some embodiments, the storage pools are primarily utilized to group storage devices based on device types and performance. For example, SSDs are grouped into SSD pools, and HDDs are grouped into HDD pools. Furthermore, in some embodiments, the storage virtualization and management services module implements methods to support various data storage management services such as data protection, data migration, data deduplication, replication, thin provisioning, snapshots, data backups, etc.

Storage systems, such as the data storage system 130 of system 100, may be required to provide both high performance and a rich set of advanced data service features for end-users thereof (e.g., users operating compute nodes 110, applications running on compute nodes 110). Performance may refer to latency, or other metrics such as IO operations per second (IOPS), bandwidth, etc. Advanced data service features may refer to data service features of storage systems including, but not limited to, services for data resiliency, thin provisioning, data reduction, space efficient snapshots, etc. Fulfilling both performance and advanced data service feature requirements can represent a significant design challenge for storage systems. This may be due to different advanced data service features consuming significant resources and processing time. Such challenges may be even greater in software-defined storage systems in which custom hardware is not available for boosting performance.

Device tiering may be used in some storage systems, such as in storage systems that contain some relatively "fast" and expensive storage devices and some relatively "slow" and less expensive storage devices. In device tiering, the "fast" devices may be used when performance is the primary requirement, where the "slow" and less expensive devices may be used when capacity is the primary requirement. Such device tiering may also use cloud storage as the "slow" device tier. Some storage systems may also or alternately separate devices offering the same performance level to gain performance isolation between different sets of storage volumes. For example, the storage systems may separate the "fast" devices into different groups to gain performance isolation between storage volumes on such different groups of the "fast" devices.

Illustrative embodiments provide functionality for optimizing or improving performance of GC processing in SDS infrastructure. Data storage system 130, as an example, may be configured to support different types of storage services (e.g., SDS services) having different characteristics (e.g., cost, performance, availability, etc.). By way of example, the above-described "device tiering" may be used to provide different storage tiers with different characteristics (e.g., "fast" devices which are relatively expensive and "slow" devices which are relatively inexpensive). In some embodiments, the compute nodes 110 and/or storage nodes 140 are assumed to comprise virtual computing resources such as VMs or containers, which are instantiated with associated local storage. The local storage of such virtual computing resources used to implement the compute nodes 110 and/or storage nodes 140 is ephemeral, in that the local storage is lost when the virtual computing resources are shut down. To optimize or improve the processing of GC requests, the GC processing logic 117 is configured to intelligently perform GC on a stripe-by-stripe basis rather than on a page-by-page basis. For example, GC may be used to update data from the ephemeral local storage to a backend persistent storage that implements an object store in which pages are stored as objects. To improve GC processing, individual stripes of a page which have changed data may be written to the object store of the backend persistent storage as page "delta" objects, rather than rewriting entire page objects (e.g., where some or even most of the page object may be unchanged).

The data restoration logic 119 is configured to restore data from the persistent storage utilizing the page objects and page delta objects.

An exemplary process for efficient garbage collection processing will now be described in more detail with reference to the flow diagram of FIG. 2. It is to be understood that this particular process is only an example, and that additional or alternative processes for efficient garbage collection processing may be used in other embodiments.

In this embodiment, the process includes steps 200 through 208. These steps are assumed to be performed using the GC processing logic 117 and the data restoration logic 119, which as noted above may be implemented in the management nodes 115 of system 100, in storage nodes 140 of the data storage system 130 of system 100, in compute nodes 110 of system 100, combinations thereof, etc. The process begins with step 200, initiating, for a storage system comprising two or more storage nodes, garbage collection for data pages stored in local storage of at least one of the two or more storage nodes. The storage system further comprises persistent storage implementing an object store. The storage system may comprise a SDS system, and the two or more storage nodes may be implemented at least in part as virtual computing instances. The local storage of the virtual computing instances comprises ephemeral storage that does not persist when the virtual computing instances are shut down. The persistent storage may be implemented utilizing a first type of software-defined storage resources providing a first performance level, and the local storage of the virtual computing instances may be implemented utilizing a second type of software-defined storage resources providing a second performance level, the second performance level being higher than the first performance level. The persistent storage may be implemented utilizing cloud-based object storage.

In step 202, a validity score for a given one of the data pages stored in the local storage of said at least one of the two or more storage nodes is determined. The validity score characterizes a size of changed data in the given data page. The given data page may comprise a plurality of data stripes of fixed size, and the validity score may characterize a number of the plurality of data stripes of the given data page having changed data.

The validity score for the given data page is compared to at least one designated threshold in step 204. Step 204 may include comparing (i) a size of the given data page and (ii) a size of one or more existing page delta objects associated with the given data page in the object store. The at least one designated threshold is dynamically adjusted based at least in part on a current load of the storage system. In step 206, a given page object for the given data page in the object store of the persistent storage is updated responsive to a first comparison result. In step 208, a page delta object for the given data page is generated in the object store of the persistent storage responsive to a second comparison result different than the first comparison result. The page delta object comprises the changed data in the given data page.

The generated page delta object may comprise a header and a payload, the header comprising a list of stripes of the given data page included in the generated page delta object, the payload comprising an array of stripe data for the stripes of the given data page included in the generated page delta object. The given page object in the object store may be associated with a given page generation number, and the generated page delta object may be associated with the given page generation number of the given data page and a delta ordinal number. The generated page delta object may have a name that is a concatenation of a page name of the given page object, the given page generation number, and the delta ordinal number. The page name of the given page object may be based at least in part on a device identifier of a given storage device and an index corresponding to a page offset of the given data page in the given storage device.

Figure 2:
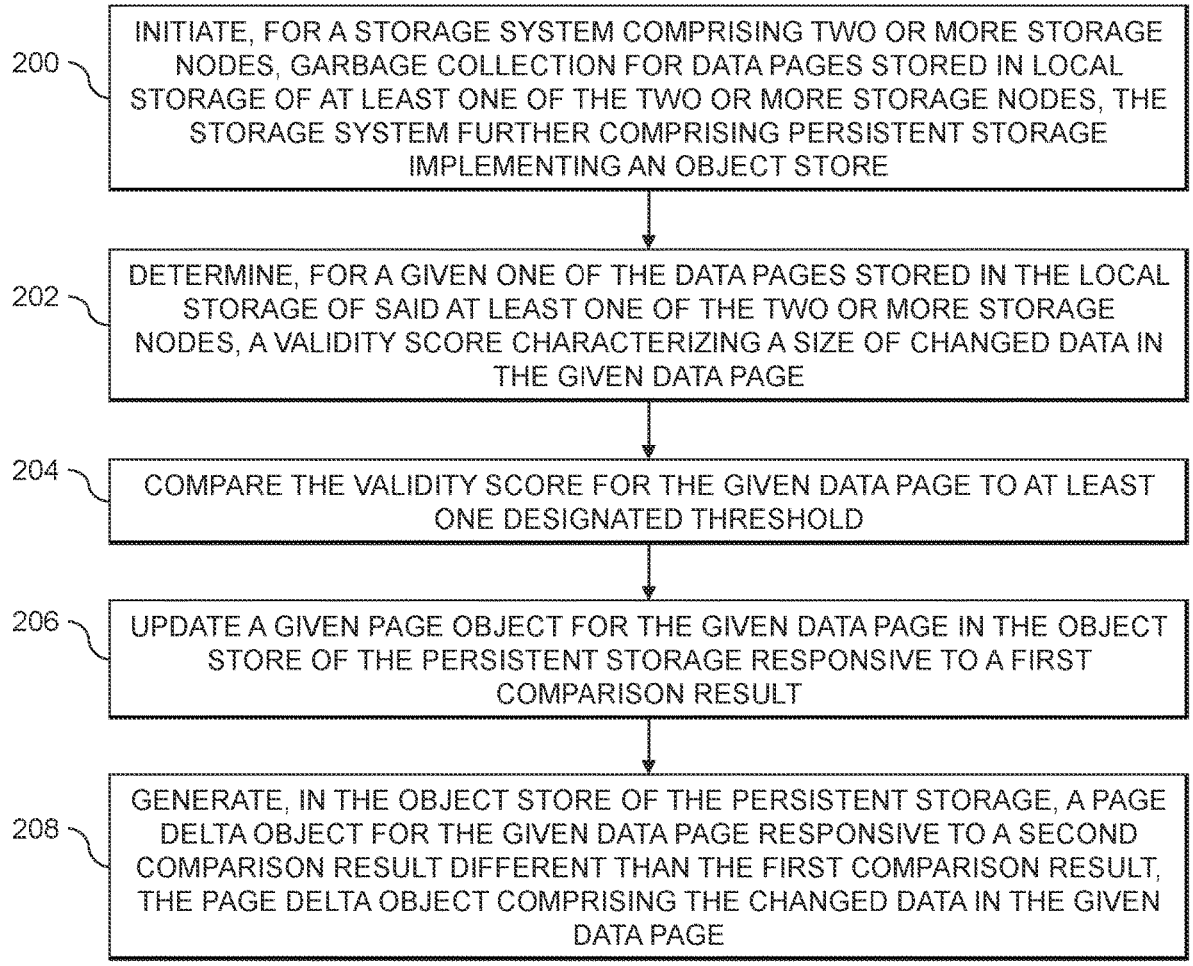
FIG. 2 is a flow diagram of an exemplary process for efficient garbage collection processing in an illustrative embodiment.

The FIG. 2 process may further include restoring the given data page from the object store to the local storage of a given one of the two or more storage nodes utilizing the generated page delta object. Restoring the given data page from the object store may comprise: determining a current generation number for the given data page; identifying, in the object store, (i) a given page object associated with the current generation number and (ii) one or more page delta objects associated with the given data page and the current generation number; and restoring data of the given data page from (i) the given page object associated with the current generation number and (ii) the one or more page delta objects associated with the given data page and the current generation number.

Various storage architectures, including SDS architectures, may be built to utilize cloud computing resources. Storage architectures built for the cloud may utilize object storage for storing data. Object storage is very flexible and resilient. Object storage is also advantageously more cost effective (e.g., a lower cost per capacity) than other types of storage (e.g., other types of cloud-based storage services, such as cloud-based block storage services). Accessing objects in an object store, however, is relatively expensive and slow compared with other types of storage (e.g., other types of cloud-based storage services, such as cloud-based block storage services). Therefore, a storage architecture may combine local ephemeral storage (e.g., direct attach storage devices) and object storage. The local ephemeral storage is very efficient for performing writes and reads, but the data may get lost (e.g., as the storage is ephemeral) and so the object storage may be accessed only for bulk writes to ensure data persistency. Storage systems may combine ephemeral storage for read access, with object storage for resiliency. Such storage systems may be used for database implementations, where the ephemeral storage copy of data is used as a caching layer.

Bulk writes may be performed using a log-structure approach which also involves GC processing. A naïve approach is to perform GC in a fixed, large size. GC processes may be optimized by taking advantage of the non-homogeneity of data validity to perform GC on granular selected parts of the data. Illustrative embodiments provide technical solutions for implementing optimized or improved GC processes in a storage architecture that uses object storage for persistency. In some embodiments, the storage architecture comprises a SDS infrastructure including SDS cloud appliances.

Figure 3:
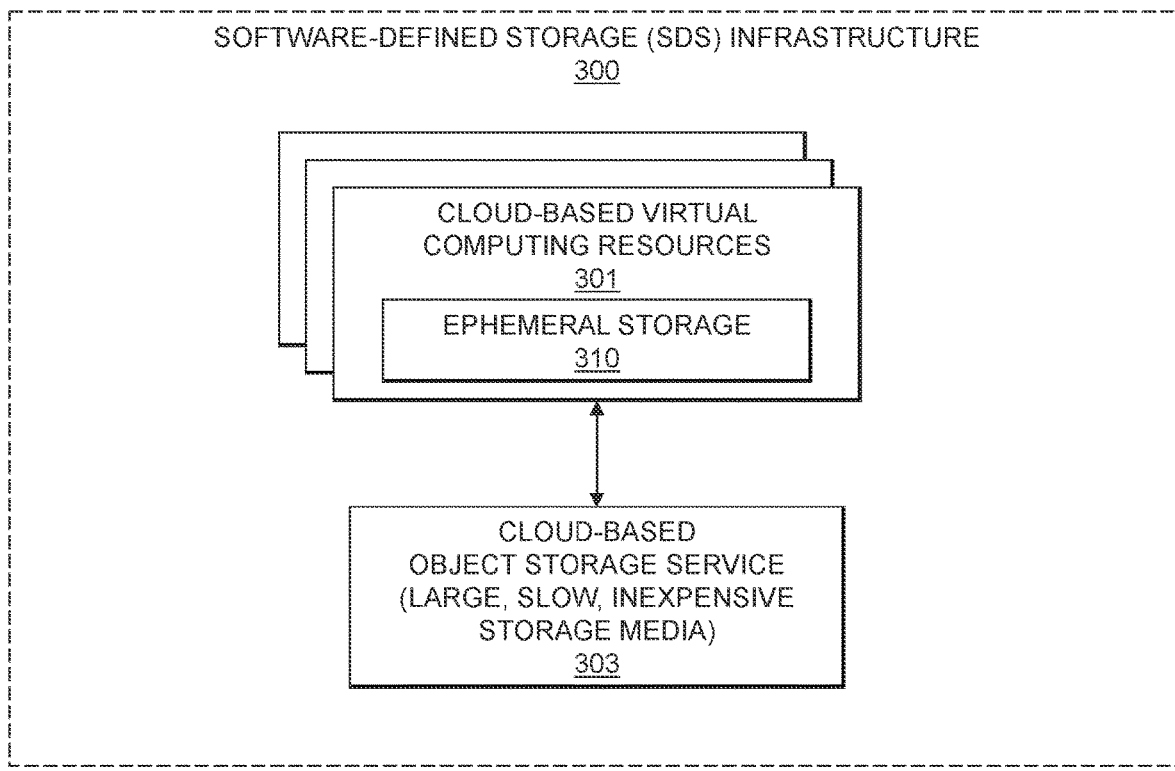
FIG. 3 shows a software-defined storage cloud infrastructure in an illustrative embodiment.

FIG. 3 shows an example of a SDS infrastructure 300 (e.g., a SDS cloud-based infrastructure), which includes various storage appliances having different cost and performance characteristics. In the FIG. 3 example, the SDS infrastructure 300 includes cloud-based virtual computing resources 301 (e.g., implementing compute nodes 110 and/or storage nodes 140) and a cloud-based object storage service 303. For ease of illustration, in the description below it is assumed that the cloud-based virtual computing resources 301 comprise cloud VMs, and are thus also referred to herein as cloud VMs 301. It should be appreciated, however, that other types of virtual computing resources such as containers may be used in other embodiments.

The cloud VMs 301 implement ephemeral storage 310 (e.g., in the form of "direct attach" local drives, which may be provided by default in VMs offered by a cloud service provider on which the cloud VMs 301 execute). As a particular example, the ephemeral storage 310 may include local drives in Amazon Elastic Compute Cloud (EC2) in an Amazon Web Services (AWS) cloud infrastructure. The ephemeral storage 310 (e.g., the local drives of the cloud VMs 301) can perform well, and has cost advantages in that such storage does not incur extra costs (e.g., as it is provided by default in the cloud VMs 301). While the ephemeral storage 310 can have a large storage capacity, it has drawbacks in that it is ephemeral—the data stored in the local drives of the cloud VMs 301 is lost when the cloud VMs 301 are shut down.

The cloud-based object storage service 303 implements object storage in the SDS infrastructure 300, and is an example of the underlying storage which may be used to provide persistent backend storage in the data storage system 130. As a particular example, the cloud-based object storage service 303 may include object storage such as Amazon Simple Storage Service (S3) in AWS cloud infrastructure. The cloud-based object storage service 303 provides a relatively lower cost storage option, but its performance is also relatively slow and may require transformation of block storage into objects using object storage pools. For example, the ephemeral storage 310 may utilize block storage. Generally, the cloud-based object storage service 303 provides large, slow and inexpensive storage media relative to the ephemeral storage 310 of the cloud VMs 301.

It should be noted that while particular examples of the ephemeral storage 310 in the cloud VMs 301 (e.g., Amazon EC2) and the cloud-based object storage service 303 (e.g., Amazon S3) are given in the context of an AWS cloud infrastructure, various other types of cloud infrastructure (e.g., Microsoft Azure, Google Cloud, etc.) may offer similar options with equivalent functionality and performance characteristics. Further, it is not required that all portions of the SDS infrastructure 300 be hosted on clouds of a same cloud service provider. For example, the cloud VMs 301 may be hosted on clouds of a first cloud service provider and the cloud-based object storage service 303 may be hosted on a second cloud of a second cloud service provider. It is also possible that one or both of the cloud VMs 301 and the cloud-based object storage service 303 utilize clouds of two or more cloud service providers.

In the description below, a "block" refers to the unit of IO that a user or host utilizes. For example, a block storage system may use 4 kilobytes (KB) as the unit of IO. It should be appreciated, however, that various other block sizes may be used as desired. A "chunk" logically corresponds with blocks, but may physically be different due to compression and other transformations. A "stripe" is a contiguous group of chunks that has a consistent size. For example, a stripe may be 1 megabyte (MB) and include hundreds of chunks. It should be appreciated, however, that various other stripe sizes may be used as desired. A "page" is a group of stripes. Several factors determine the size of a page, such as the number of stripes in a page. The page size may be selected, for example, to minimize the number of accesses to the object store. In some embodiments, a stripe may span multiple storage devices for protection purposes (e.g., for implementing a RAID 5 storage configuration).

A storage system may implement a GC mechanism which ranks or scores the different pages according to their "validness" (e.g., how much of the data in each page is valid). One or more pages which are relatively empty (e.g., with low validity scores indicating that such pages have a relatively small amount of valid data) are selected for performing GC. The storage system will read one of the selected pages, compact any valid chunks stored in that page, and combine such valid chunks with chunks from other ones of the selected pages. The combined valid chunks are then written into one or more empty pages. Once this process is completed, one or more of the selected pages are empty and can host new writes. New writes can be written in bulk to the empty pages. The pages are stored in an object store (e.g., implemented by the cloud-based object storage service 303). In most cases, at least a subset of the pages are also cached in the local ephemeral storage (e.g., the ephemeral storage 310 of the cloud VMs 301).

In many cases, page validity is not homogeneous, and different stripes within a particular page have different validity levels. For example, some of the stripes of a given page may be empty (e.g., all the chunks of those stripes are invalid), while other stripes of the given page may be mostly full (e.g., most of the chunks of those stripes are valid). In such cases, it is advantageous to perform GC at the stripe level to save considerable 10 and processing resources. Following a stripe-based GC, some of the stripes of a page would be empty, but others would not. Therefore, subsequence writes are written to the empty stripes. This involves updating the page instead of re-writing the page. Object store solutions, however, do not support object updates. Thus, one option is to fully re-write the page copy in the object storage. Such an approach, however, is highly inefficient since it involves re-writing stripes (e.g., potentially many stripes) that have not changed.

The technical solutions described herein provide an approach for stripe-based GC which avoids re-writing entire pages in object storage. Instead, the technical solutions write the page updates only to a new object in the object storage. The data in the new object, referred to as a "page delta object" includes a header and a payload. The header comprises a list of stripes included in the page delta object, and the payload comprises an array of stripes (e.g., which have changed data). The page delta object's size is not fixed, and depends on the number of stripes which are included. To allow the storage system to identify all of the objects that pertain to a same page (e.g., an original page object, and any page delta objects for that page object), the name of the page delta objects may be constructed as a concatenation of the name of the original page object, a page generation, and a delta ordinal. The name of the original page object may itself be constructed from a corresponding device identifier (e.g., of a block storage device) and an index value, where the index value corresponds with the page offset. The "generation" of a page is increased (e.g., incremented) when writing a full page, at which time the delta ordinal is reset (e.g., set to zero). When the new generation of a page is created, the storage system may delete the previous generation of that page.

In some approaches, when a storage system is performing GC and creating new empty stripes, the storage system will select relatively empty pages and perform GC for a set of relatively invalid stripes within the relatively empty pages. The technical solutions described herein provide a new approach which advantageously limits the amount of storage capacity which is dedicated for delta updates (e.g., page delta objects). To minimize or reduce the amount of storage capacity which is dedicated for delta updates, some embodiments initiate performance of GC for a full page when the accumulated page deltas are more than k times the page size (e.g., where k=2). The value of k may be selected based at least in part on the cost of storage capacity in the object store and the performance impact of performing GC for a full page. A storage system in some embodiments may utilize a dynamic value of k, where the value of k may increase when the storage system is under stress (e.g., heavy IO load) and may decrease when the storage system is not under stress (e.g., during idle times). Moreover, the storage system may restrict the overall storage capacity of the page delta objects, and may allow some pages to grow (e.g., to have more page delta objects) than other pages.

A recovery procedure using page and page delta objects will now be described. When recovering data from the object store (e.g., to a locally attached storage device, which is an ephemeral storage instance), the storage system will, for each device and for each page index, issue a "ListObjects" command with the original page name as the prefix command argument. Next, the highest page generation among all object names for a given page index is found. This is used to filter out any objects which correspond to older generations for the given page index. A page is then constructed in memory (e.g., random-access memory (RAM)). In memory, a buffer is allocated for the page and formatted (e.g., to all zeroes). For each delta ordinal, starting from an initial value (e.g., from 0), a "GetObject" command is issued for "originalName generation deltaOrdinal" (e.g., where "originalName" is the name of the original page object for a given page, generation is the current generation for the given page, and "deltaOrdinal" is the next delta ordinal to be read) to obtain the stripe data, and the stripe data is applied to the relevant offsets (e.g., according to header data) in the buffer allocated in the memory. Once completed, the data in the buffer is written to the locally attached storage device (e.g., the ephemeral storage instance).

Figure 4:
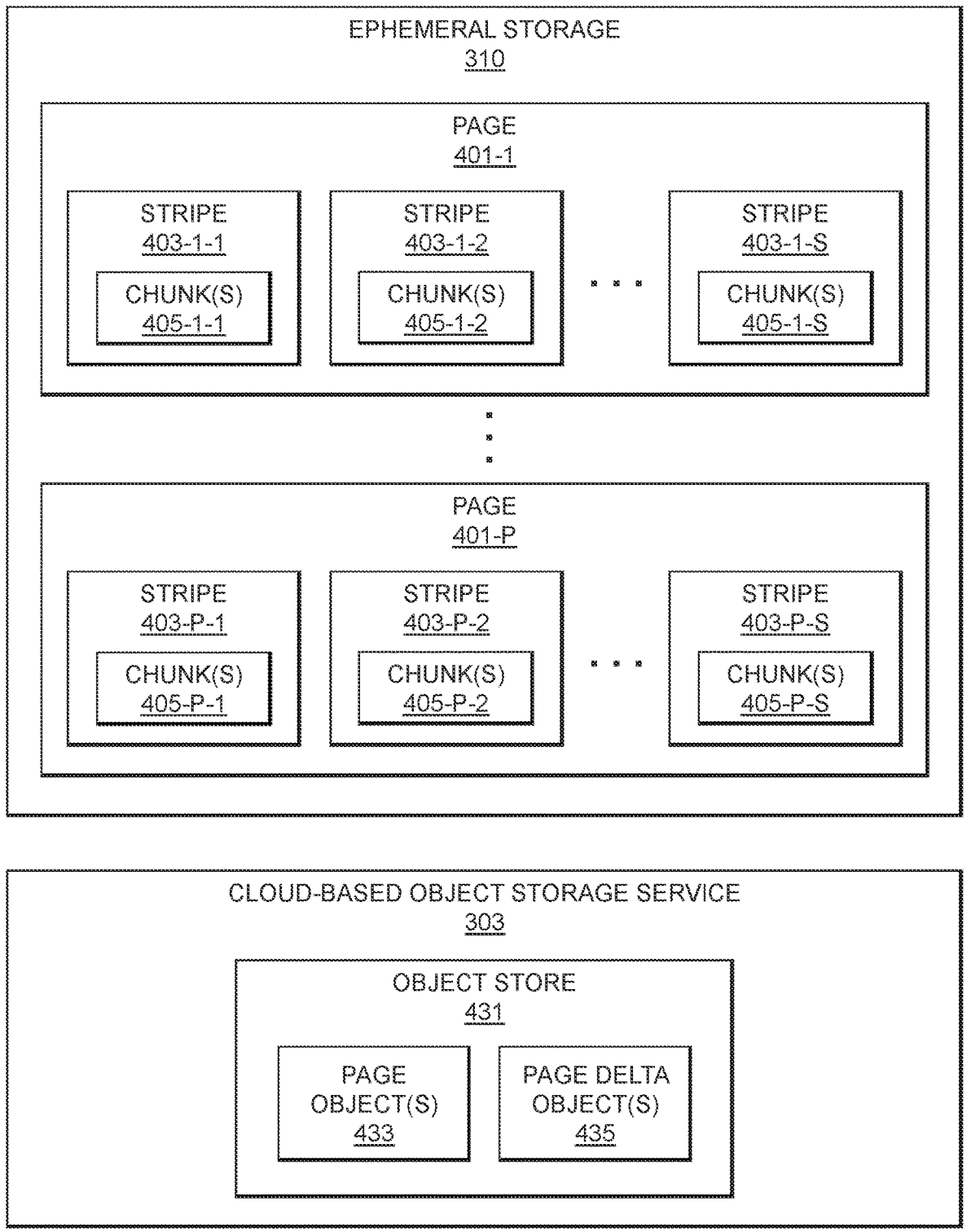
FIG. 4 shows storage of data in a software-defined storage cloud infrastructure in an illustrative embodiment.

FIG. 4 shows an example of data which may be stored in the SDS infrastructure 300 of FIG. 3. In the FIG. 4 example, the ephemeral storage 310 stores a set of pages 401-1 through 401-P (collectively, pages 401). The page 401-1 comprises a set of stripes 403-1-1, 403-1-2, . . . 403-1-S (collectively, stripes 403-1), with each of the stripes 403-1 including one or more chunks 405-1-1, 405-1-2, . . . 405-1-S (collectively, chunks 405-1). The page 401-P comprises a set of stripes 403-P-1, 403-P-2, . . . 403-P-S (collectively, stripes 403-P), with each of the stripes 403-P including one or more chunks 405-P-1, 405-P-2, . . . 405-P-S (collectively, chunks 405-P). The cloud-based object storage service 303 implements an object store 431 which comprises page objects 433 corresponding to the pages 401, as well as page delta objects 435. The page delta objects 435 store sets of changed stripe data for ones of the page objects 433, which allows the original page objects 433 to remain and only requires writing of changed stripe data in the page delta objects 435 as described above.

Figure 5A:
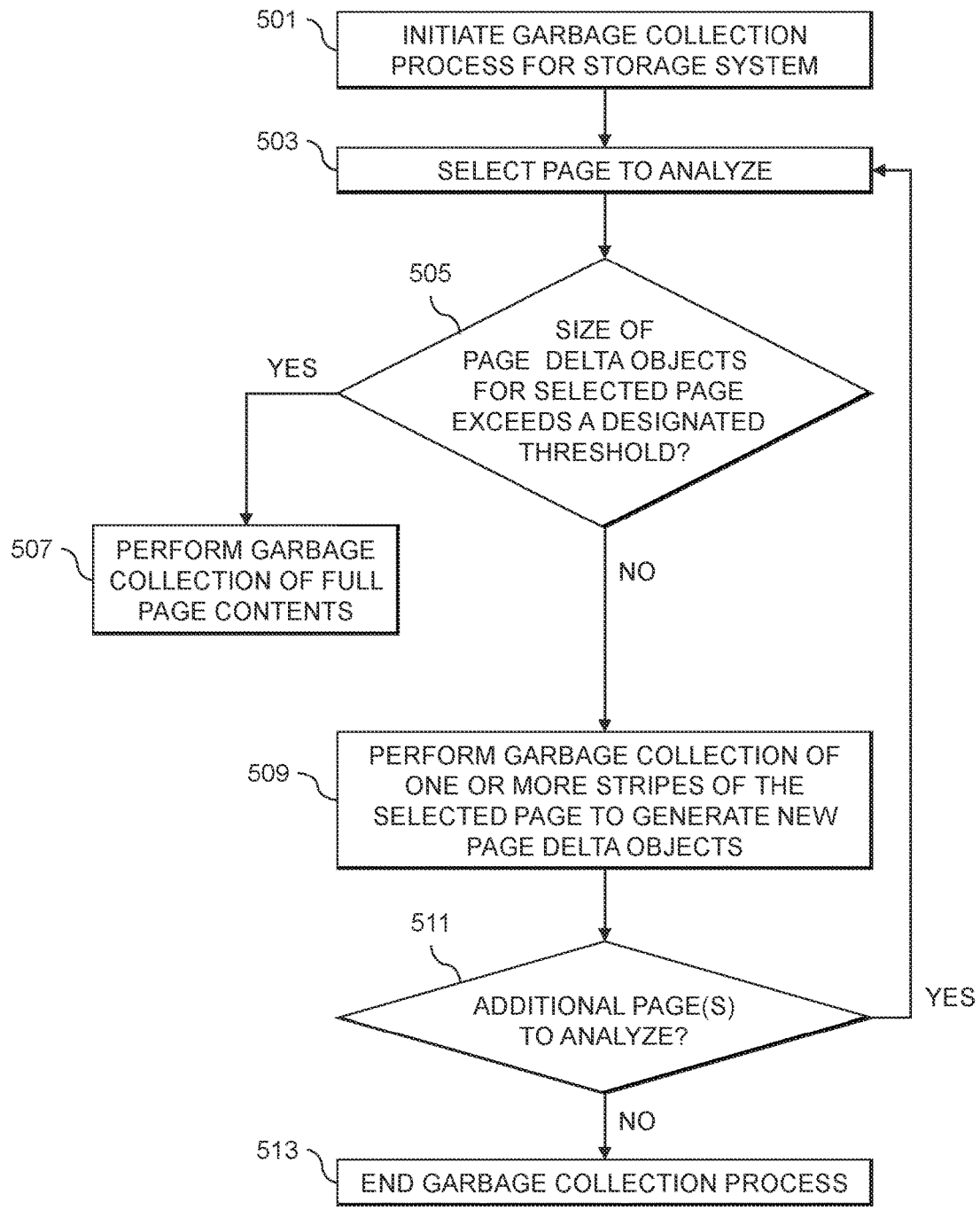
FIGS. 5A and 5B show process flows for garbage collection to an object store and restoration of data from the object store in an illustrative embodiment.
Figure 5B:
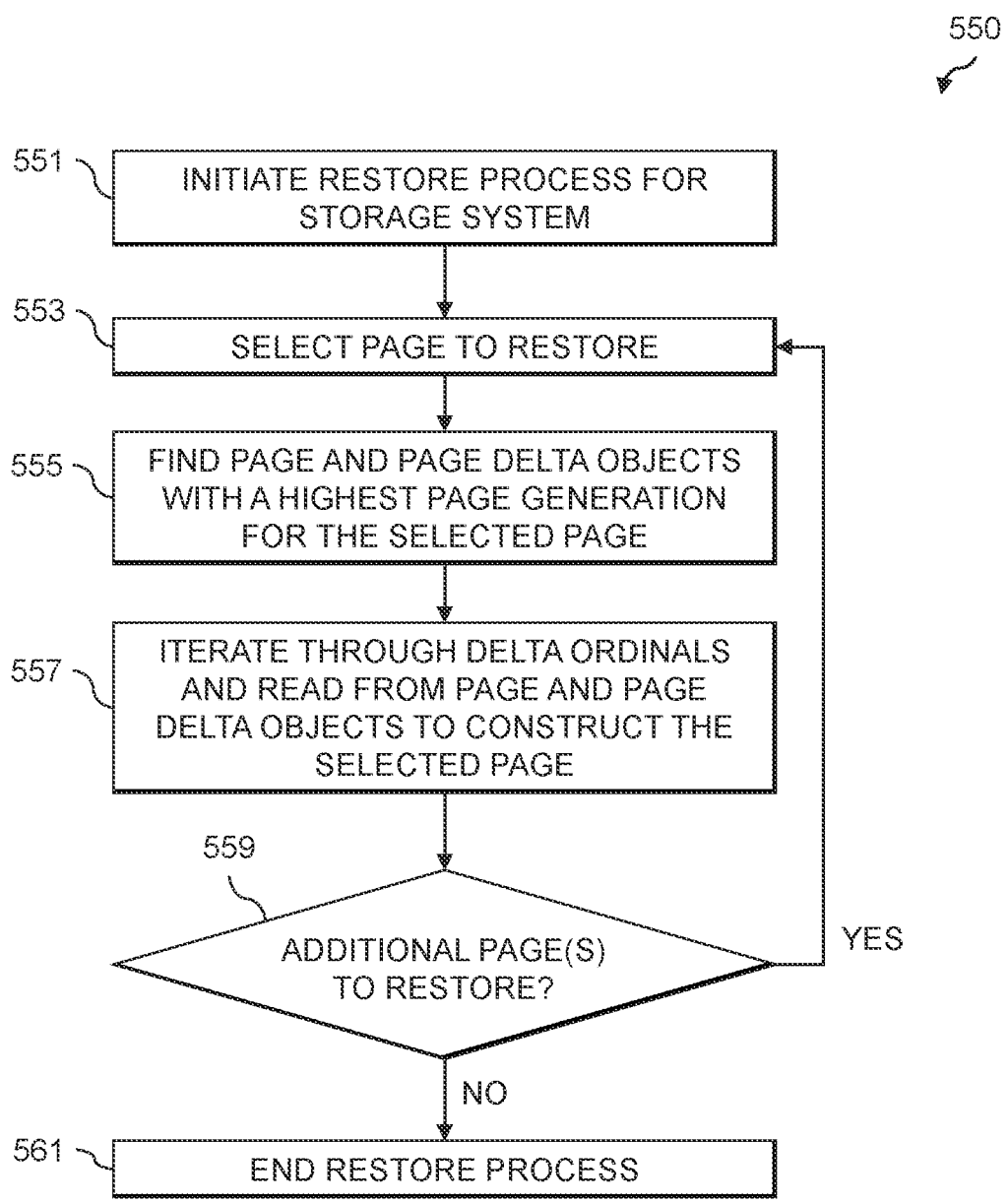

FIGS. 5A and 5B show respective process flows 500 and 550 for GC to the object store 431 of the cloud-based object storage service 303, and for restoration of data from the object store 431 of the cloud-based object storage service 303 to the ephemeral storage 310.

As shown in FIG. 5A, the process flow 500 begins in step 501 with initiating a GC process for a storage system (e.g., the SDS infrastructure 300 of FIG. 3). In step 503, a page is selected to analyze, such as page 401-1. In step 505, a determination is made as to whether the size of ones of the page delta objects 435 in the object store 431 corresponding to the selected page exceed a designated threshold (e.g., more than k times the size of the selected page). If the result of the step 505 determination is yes, the process flow 500 proceeds to step 507 where GC is performed for the full page contents of the selected page. If the result of the step 505 determination is no, the process flow 500 proceeds to step 509 where GC is performed for one or more stripes of the selected page to generate new page delta objects for storage in the object store 431. The one or more stripes may include those whose data has a low validity score (e.g., relatively large amounts of changed data). In step 511, a determination is made as to whether there are any additional pages to analyze. If the result of the step 511 determination is yes, the process flow 500 returns to step 503 where another page is selected to analyze. If the result of the step 511 determination is no, the process flow 500 continues to step 513 where the GC process ends.

As shown in FIG. 5B, the process flow 550 begins in step 551 where a restore process is initiated for a storage system (e.g., the SDS infrastructure 300 of FIG. 3). In step 553, a page to be restored is selected. In step 555, ones of the page objects 433 and page delta objects 435 in the object store 431 are searched to determine a highest page generation for the selected page. In step 557, the delta ordinals of the page objects 433 and page delta objects 435 in the object store 431 having the highest page generation for the selected page are iterated through to to construct the selected page, which is restored to the ephemeral storage 310. In step 559, a determination is made as to whether there are any additional pages to be restored. If the result of the step 559 determination is yes, the process flow 550 returns to step 553 where a new page is selected. If the result of the step 559 determination is no, the process flow 550 continues to step 561 where the restore process ends.

Use of the page delta objects in a storage system provides improved performance. Write performance is improved, for example, through avoiding redundant writes of stripes that have not changed. The use of page delta objects can also reduce GC reads, in that only stripes which are garbage collected need to be read. This saves central processing unit (CPU) cycles or other processing resources, as well as storage bandwidth. In cases where a page is not cached, this also saves network bandwidth reading from the object storage. The use of page delta objects also reduces writes to the object store, in that only new stripes with changed data are written (rather than entire pages), which saves CPU cycles or other processing resources as well as network bandwidth.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Figure 6:
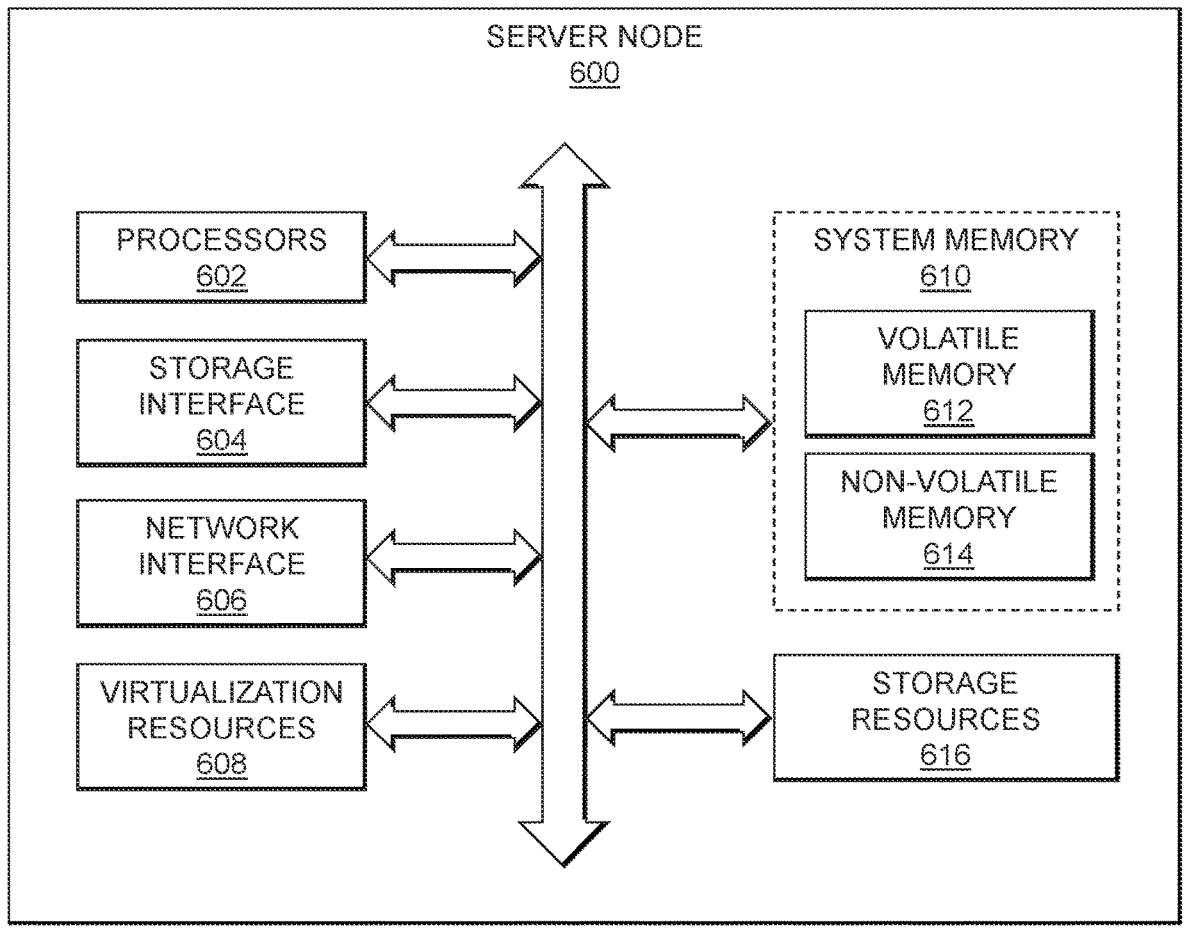
FIG. 6 schematically illustrates a framework of a server node for implementing a storage node which hosts logic for efficient garbage collection processing in an illustrative embodiment.

FIG. 6 schematically illustrates a framework of a server node (or more generally, a compute node) for hosting logic for efficient garbage collection processing according to an exemplary embodiment of the disclosure. The server node 600 comprises processors 602, storage interface circuitry 604, network interface circuitry 606, virtualization resources 608, system memory 610, and storage resources 616. The system memory 610 comprises volatile memory 612 and non-volatile memory 614. The processors 602 comprise one or more types of hardware processors that are configured to process program instructions and data to execute a native operating system (OS) and applications that run on the server node 600.

For example, the processors 602 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 604 enables the processors 602 to interface and communicate with the system memory 610, the storage resources 616, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 606 enables the server node 600 to interface and communicate with a network and other system components. The network interface circuitry 606 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 608 can be instantiated to execute one or more service or functions which are hosted by the server node 600. For example, the virtualization resources 608 can be configured to implement the various modules and functionalities of the volume tiering logic as discussed herein. In one embodiment, the virtualization resources 608 comprise virtual machines that are implemented using a hypervisor platform which executes on the server node 600, wherein one or more virtual machines can be instantiated to execute functions of the server node 600. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 600, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 608 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 600 as well execute one or more of the various modules and functionalities as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various components of, e.g., the GC processing logic 117 and the data restoration logic 119, comprise program code that is loaded into the system memory 610 (e.g., volatile memory 612), and executed by the processors 602 to perform respective functions as described herein. In this regard, the system memory 610, the storage resources 616, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 610 comprises various types of memory such as volatile RAM, NVRAM, or other types of memory, in any combination. The volatile memory 612 may be a dynamic random-access memory (DRAM) (e.g., DRAM DIMM (Dual In-line Memory Module), or other forms of volatile RAM. The non-volatile memory 614 may comprise one or more of NAND Flash storage devices, SSD devices, or other types of next generation non-volatile memory (NGNVM) devices. The system memory 610 can be implemented using a hierarchical memory tier structure wherein the volatile memory 612 is configured as the highest-level memory tier, and the non-volatile memory 614 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 602 to execute a native operating system and one or more applications or processes hosted by the server node 600, and to temporarily store data that is utilized and/or generated by the native OS and application programs and processes running on the server node 600. The storage resources 616 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
initiating, for a storage system comprising two or more storage nodes, garbage collection for data pages stored in local storage of at least one of the two or more storage nodes, the storage system further comprising persistent storage implementing an object store;
determining, for a given one of the data pages stored in the local storage of said at least one of the two or more storage nodes, a validity score characterizing a size of changed data in the given data page;
comparing the validity score for the given data page to at least one designated threshold;
updating a given page object for the given data page in the object store of the persistent storage responsive to a first comparison result; and
generating, in the object store of the persistent storage, a page delta object for the given data page responsive to a second comparison result different than the first comparison result, the page delta object comprising the changed data in the given data page;
wherein comparing the validity score for the given data page to the at least one designated threshold is based at least in part on one or more characteristics of one or more existing page delta objects, if any, that are associated with the given data page in the object store.

2. The apparatus of claim 1 wherein the storage system comprises a software-defined storage system, and wherein the two or more storage nodes are implemented at least in part as virtual computing instances.

3. The apparatus of claim 2 wherein the local storage of the virtual computing instances comprises ephemeral storage that does not persist when the virtual computing instances are shut down.

4. The apparatus of claim 2 wherein the persistent storage is implemented utilizing a first type of software-defined storage resources providing a first performance level, and wherein the local storage of the virtual computing instances is implemented utilizing a second type of software-defined storage resources providing a second performance level, the second performance level being higher than the first performance level.

5. The apparatus of claim 2 wherein the persistent storage is implemented utilizing cloud-based object storage.

6. The apparatus of claim 1 wherein the given data page comprises a plurality of data stripes of fixed size, and wherein the validity score characterizes a number of the plurality of data stripes of the given data page having changed data.

7. The apparatus of claim 1 wherein comparing the validity score for the given data page to the at least one designated threshold comprises comparing (i) a size of the given data page and (ii) a size of the one or more existing page delta objects associated with the given data page in the object store.

8. The apparatus of claim 1 wherein the at least one designated threshold is dynamically adjusted based at least in part on a current load of the storage system.

9. The apparatus of claim 1 wherein the generated page delta object comprises a header and a payload, the header comprising a list of stripes of the given data page included in the generated page delta object, the payload comprising an array of stripe data for the stripes of the given data page included in the generated page delta object.

10. The apparatus of claim 1 wherein the given page object in the object store is associated with a given page generation number, and wherein the generated page delta object is associated with the given page generation number of the given data page and a delta ordinal number.

11. The apparatus of claim 10 wherein the generated page delta object has a name that is a concatenation of a page name of the given page object, the given page generation number, and the delta ordinal number.

12. The apparatus of claim 11 wherein the page name of the given page object is based at least in part on a device identifier of a given storage device and an index corresponding to a page offset of the given data page in the given storage device.

13. The apparatus of claim 1 wherein the at least one processing device is further configured to perform the step of restoring the given data page from the object store to the local storage of a given one of the two or more storage nodes utilizing the generated page delta object.

14. The apparatus of claim 13 wherein restoring the given data page from the object store comprises:
determining a current generation number for the given data page;
identifying, in the object store, (i) a given page object associated with the current generation number and (ii) one or more page delta objects associated with the given data page and the current generation number; and
restoring data of the given data page from (i) the given page object associated with the current generation number and (ii) the one or more page delta objects associated with the given data page and the current generation number.

15. A computer program product comprising a non-transitory processor-readable storage medium having stored therein program code of one or more software programs, wherein the program code when executed by at least one processing device causes the at least one processing device to perform steps of:
initiating, for a storage system comprising two or more storage nodes, garbage collection for data pages stored in local storage of at least one of the two or more storage nodes, the storage system further comprising persistent storage implementing an object store;
determining, for a given one of the data pages stored in the local storage of said at least one of the two or more storage nodes, a validity score characterizing a size of changed data in the given data page;
comparing the validity score for the given data page to at least one designated threshold;
updating a given page object for the given data page in the object store of the persistent storage responsive to a first comparison result; and
generating, in the object store of the persistent storage, a page delta object for the given data page responsive to a second comparison result different than the first comparison result, the page delta object comprising the changed data in the given data page;
wherein comparing the validity score for the given data page to the at least one designated threshold is based at least in part on one or more characteristics of one or more existing page delta objects, if any, that are associated with the given data page in the object store.

16. The computer program product of claim 15 wherein the program code when executed further causes the at least one processing device to perform the step of restoring the given data page from the object store to the local storage of a given one of the two or more storage nodes utilizing the generated page delta object.

17. The computer program product of claim 16 wherein restoring the given data page from the object store comprises:
determining a current generation number for the given data page;
identifying, in the object store, (i) a given page object associated with the current generation number and (ii) one or more page delta objects associated with the given data page and the current generation number; and
restoring data of the given data page from (i) the given page object associated with the current generation number and (ii) the one or more page delta objects associated with the given data page and the current generation number.

18. A method comprising:
initiating, for a storage system comprising two or more storage nodes, garbage collection for data pages stored in local storage of at least one of the two or more storage nodes, the storage system further comprising persistent storage implementing an object store;
determining, for a given one of the data pages stored in the local storage of said at least one of the two or more storage nodes, a validity score characterizing a size of changed data in the given data page;
comparing the validity score for the given data page to at least one designated threshold;
updating a given page object for the given data page in the object store of the persistent storage responsive to a first comparison result; and
generating, in the object store of the persistent storage, a page delta object for the given data page responsive to a second comparison result different than the first comparison result, the page delta object comprising the changed data in the given data page;
wherein comparing the validity score for the given data page to the at least one designated threshold is based at least in part on one or more characteristics of one or more existing page delta objects, if any, that are associated with the given data page in the object store; and wherein the method is performed by at least one processing device comprising a processor coupled to a memory.

19. The method of claim 18 further comprising restoring the given data page from the object store to the local storage of a given one of the two or more storage nodes utilizing the generated page delta object.

20. The method of claim 19 wherein restoring the given data page from the object store comprises:
- determining a current generation number for the given data page;
- identifying, in the object store, (i) a given page object associated with the current generation number and (ii) one or more page delta objects associated with the given data page and the current generation number; and
- restoring data of the given data page from (i) the given page object associated with the current generation number and (ii) the one or more page delta objects associated with the given data page and the current generation number.

\* \* \* \* \*